(12) United States Patent
Lappeläinen et al.

(10) Patent No.: US 7,990,905 B2
(45) Date of Patent: Aug. 2, 2011

(54) COMMUNICATION SYSTEM USING RELAY BASE STATIONS WITH ASYMMETRIC DATA LINKS

(75) Inventors: Antti Lappeläinen, Espoo (FI); Jussi Ojala, Helsinki (FI)

(73) Assignee: Nokia Corporation, Espoo (FI)

( * ) Notice: Subject to any disclaimer, the term of this patent is extended or adjusted under 35 U.S.C. 154(b) by 1041 days.

(21) Appl. No.: 10/584,973

(22) PCT Filed: Dec. 30, 2003

(86) PCT No.: PCT/IB03/06229
§ 371 (c)(1),
(2), (4) Date: May 15, 2007

(87) PCT Pub. No.: WO2005/067173
PCT Pub. Date: Jul. 21, 2005

(65) Prior Publication Data
US 2008/0075178 A1    Mar. 27, 2008

(51) Int. Cl.
*H04B 7/14* (2006.01)
*H04B 7/185* (2006.01)
*H04W 72/00* (2009.01)
(52) U.S. Cl. .................. 370/315; 455/13.1; 455/450.1; 455/452.1; 455/452.2; 455/453
(58) Field of Classification Search .................. 370/315
See application file for complete search history.

(56) References Cited

FOREIGN PATENT DOCUMENTS

| DE | 101 45 759 | 4/2003 |
|---|---|---|
| JP | 8-18499 | 1/1996 |
| JP | 10-336095 | 12/1998 |
| JP | 2000-165937 | 6/2000 |
| JP | 2002-112351 | 4/2002 |
| JP | 2002-171215 | 6/2002 |
| JP | 2002-237781 | 8/2002 |
| JP | 2002-252587 | 9/2002 |
| JP | 2002-335204 | 11/2002 |
| JP | 2003-179611 | 6/2003 |
| JP | 2003-198442 | 7/2003 |
| WO | 03/058984 | 7/2003 |
| WO | WO 03058984 A2 * | 7/2003 |

OTHER PUBLICATIONS

Japanese Office Action for corresponding application No. 2005-513077 dated Jul. 7, 2009, 7 pages original Japanese Office Action, 11 pages English translation, 18 pages total.
Patent Abstracts of Japan, Publication No. 2002335204, Date of Publication Nov. 22, 2002.
Patent Abstracts of Japan, Publication No. 2002252587, Date of Publication Sep. 6, 2002.

(Continued)

*Primary Examiner* — Patrick N Edouard
*Assistant Examiner* — Huy C Ho

(57) ABSTRACT

A method is shown for improving the spectral efficiency of a communication system (100) that comprises at least one Super Base Station SBS (1) and at least one terminal (3-1), wherein at least one Relay Base Station RBS (2-1) is used to relay asymmetric up- and downlink data between said at least one Super Base Station SBS (1) and said at least one terminal (3-1) and wherein said asymmetry of said up- and downlink data is considered when dynamically allocating transmission resources to said relay link (5-1, 6-1) between said at least one SBS (1) and said at least one RBS (2-1) and to said link (7-1, 8-1) between said at least one RBS (2-1) and said at least one terminal (3-1).

53 Claims, 7 Drawing Sheets

OTHER PUBLICATIONS

Patent Abstracts of Japan, Publication No. 08018499, Date of Publication Jan. 19, 1996.
Patent Abstracts of Japan, Publication No. 2002171215, Date of Publication Jun. 14, 2002.
Patent Abstracts of Japan, Publication No. 2003179611, Date of Publication Jun. 27, 2003.
Patent Abstracts of Japan, Publication No. 200165937, Date of Publication Jun. 16, 2000.
Patent Abstracts of Japan, Publication No. 2003198442, Date of Publication Jul. 11, 2003.
Patent Abstracts of Japan, Publication No. 2002237781, Date of Publication Aug. 23, 2002.
Patent Abstracts of Japan, Publication No. 10336095, Date of Publication Dec. 18, 1998.
Patent Abstracts of Japan, Publication No. 2002112351, Date of Publication Apr. 12, 2002.

* cited by examiner

COMMUNICATION SYSTEM USING RELAY BASE STATIONS WITH ASYMMETRIC DATA LINKS

CROSS-REFERENCE TO RELATED APPLICATION

This patent application is the U.S. National Stage of International Application Number PCT/IB2003/006229 filed Dec. 30, 2003 and published in English on Jul. 21, 2005 as International Publication Number WO 2005/067173 A1.

FIELD OF THE INVENTION

The invention relates to a method for improving the spectral efficiency of a communication system that comprises at least one Super Base Station SBS and at least one terminal, wherein at least one Relay Base Station RBS is used to relay up- and downlink data between said at least one Super Base Station SBS and said at least one terminal, and wherein a start and a duration of up- and downlink RBS-terminal transmission periods, in which up- and downlink transmissions between said at least one RBS and said at least one terminal take place, and a start and a duration of up- and downlink RBS-SBS transmission periods, in which up- and downlink transmissions between said at least one RBS and said at least one SBS take-place, are defined by an RBS frame structure.

BACKGROUND OF THE INVENTION

The increased user bit rate requirements that are imposed on cellular mobile radio communication systems of the fourth generation (4G) call for the use of wide-band carriers. The provision of wide-band carriers is only possible in the high frequency regime of the radio spectrum, resulting in increased propagation attenuation due to increased carrier frequencies, and, consequently, reduced radio link distance. The reduced radio link distance dramatically increases the system deployment costs, because the grid of base stations or base transceiver stations has to be tighter to provide for a seamless radio coverage. Furthermore, to increase the spectral efficiency (measured in bit/s/Hz) of the overall communication system, the frequency reuse factor is reduced, i.e. the distance between cells that use the same carrier frequency decreases, resulting in an increased overall inter-cell interference contribution.

Known solutions to mitigate these problems include the deployment of a Relay Base Station (RBS), which increases the effective coverage area of the Super Base Station (SBS) it is associated with by relaying up- and downlink data between the SBS and a terminal. Data that is bound for the terminal then is first transmitted from the SBS to the RBS (in a first "hop"), and then transmitted from the RBS to the terminal (in a second "hop").

In state-of-the-art systems, both SBS and RBS use a different air interface, i.e. are equipped with additional transceivers, hard- and software, to operate a transmission link with a carrier frequency that is sufficiently spaced apart from the carrier frequencies that are used by the communication system, thus completely avoiding interference between the communication system and the transmission link between RBS and SBS. Said transmission link then may for instance be an optical link or a directional radio link. However, the costs of the RBS and SBS then may dramatically increase.

As a further approach to reduce the above-mentioned problems, Multiple-Input-Multiple-Output (MIMO) transmission techniques are under investigation. The term MIMO refers to the multiple transmission and reception antennas at the input and the output of the spatial propagation channel, whereas the multiple antennas at both the input and the output may be assigned to one station, i.e. be able to co-operate, or to several stations. MIMO transmission techniques exploit the spatial selectivity of the transmission channel by performing spatial or spatio-temporal equalisation of multi-path and fading phenomena at the input of the spatial channel, at the output of the channel or jointly at both the input and the output of the channel. This equalisation mitigates or removes the effects of small-scale and large-scale fading such as multi-path and shadowing and also allows for Space Division Multiple Access (SDMA), i.e. several data signals may be transmitted with the same carrier frequency, with the same code and at the same time instance, and separation of the data signals at the receiver is still possible. The most prominent representative of MIMO techniques is beamforming at the input (transmission side) and/or output (reception side) of the spatial transmission channel, which is of particular interest if only the antenna elements at one side of the transmission channel may co-operate. This is for instance the case if an SBS is equipped with an adaptive antenna array that is composed of several antenna elements. Similar, maximum ratio combining or optimum combining techniques may then be applied to exploit spatial diversity. MIMO techniques can be applied for both frequency-flat channels, but also for frequency-selective channels, where the spatial equalisation of the channel then is extended to a spatio-temporal equalisation of the channel. Whereas the equalisation of the channel helps to reduce the required transmission powers and thus reduces interference, the SDMA approach allows to increase the number of terminals that can be concurrently served by an SBS or RBS.

The prerequisite for the application of MIMO techniques is knowledge on channel parameters such as for instance the position of terminals to which data is transmitted to or received from, or the spatial channel impulse response of the terminal, or the spatial signature of the terminal, or the direction in azimuth and/or elevation of the terminal with respect to the transmitting/receiving antenna array. In typical radio communication scenarios, these channel parameters are generally frequency- and time-variant and can only be estimated from signals received from said terminals. Whereas in Time Division Duplex (TDD) systems, where uplink and downlink take place on the same carrier frequency, the problem of the frequency-invariance of said parameters does not arise, so that only the time-variance (which is mainly determined by the speed of the terminals) of the parameters has to be kept in mind when estimating said parameters during uplink operation and using the estimated parameters for MIMO techniques during uplink and downlink operation, in Frequency Division Duplex (FDD) systems, where uplink and downlink are transmitted in parallel, but on different carrier frequencies, parameters estimated during the reception of signals on the uplink can not be reused for MIMO techniques on the downlink due to the frequency-dependence of said parameters. Thus the application of MIMO techniques that require knowledge on channel parameters at the input (transmission side) of the channel are hard to apply in the context of FDD systems.

The current 4G simulations and analysis indicate that either TDD with globally fixed Tx/Rx turn around periods (all terminals and base stations are then synchronised in a way that the duration and time instance when terminals are allowed to transmit and the duration and time instance when the base stations are allowed to transmit are fixed across the whole communication system) or FDD should be used as duplex techniques. However, both alternatives set out from the assumption that the relation between the amount of uplink data and the amount of downlink data is the same for all base stations, which is generally not the case.

SUMMARY OF THE INVENTION

It is thus an object of the present invention to propose a method, a computer program, a computer program product, a device, a communication system, a terminal, a relay base station and a super base station that overcomes the above-mentioned problems and thus allows to increase the spectral efficiency of a communication system.

It is proposed a method for improving the spectral efficiency of a communication system that comprises at least one Super Base Station SBS and at least one terminal, wherein at least one Relay Base Station RBS is used to relay up- and downlink data between said at least one Super Base Station SBS and said at least one terminal, and wherein a start and a duration of up- and downlink RBS-terminal transmission periods, in which up- and downlink transmissions between said at least one RBS and said at least one terminal take place, and a start and a duration of up- and downlink RBS-SBS transmission periods, in which up- and downlink transmissions between said at least one RBS and said at least one SBS take place, are defined by an RBS frame structure, said method comprising dynamically allocating said up- and downlink RBS-SBS transmission periods in said RBS frame structure under consideration of an asymmetry between said up- and downlink data relayed between said at least one SBS and said at least one terminal via said at least one RBS.

Said communication system may for instance be a 3G communication system or a derivative thereof, as for instance the Universal Mobile Telecommunications System (UMTS), or a 4G communication system, wherein the coverage area of said at least one SBS is enlarged by the use of at least one RBS. The SBS may directly serve terminals (so-called SBS terminals), and also serves at least one terminal via said RBS. The downlink data that is to be transmitted to said at least one terminal then is first transmitted to said RBS (RBS-SBS downlink transmission), and then said RBS transmits said data to said at least one terminal (RBS-terminal downlink transmission). Similarly, the uplink data is transmitted to the RBS by the terminal first (RBS-terminal uplink transmission), and then from the RBS to the SBS (RBS-SBS uplink transmission).

Both TDD and FDD operation of said communication system is possible. The starting time and duration of said up- and downlink RBS-SBS transmissions and said up- and downlink RBS-terminal transmissions are defined by an RBS frame structure, which may for instance be a temporal sequence of frames, wherein each frame may consist of one or several of said up- and downlink RBS-SBS and RBS-terminal transmission periods. These up- and downlink RBS-SBS and RBS-terminal transmissions may use different carrier frequencies. Due to the dynamic allocation of said up- and downlink RBS-SBS transmission periods, the RBS frame structure may be different for different RBSs.

However, the periods in which said up- and downlink RBS-terminal transmissions are allowed may be the same for the frame structures of different RBSs, and said periods in which said up- and downlink RBS-terminal transmissions are allowed may be the same as the periods in which up- and downlink SBS-terminal transmissions are allowed.

Depending on the degree of asymmetry between the up- and downlink data that is to be relayed between said at least one SBS and said at least one terminal via said RBS, said up- and downlink RBS-SBS transmission periods are allocated in said frame structure, i.e. the starting time and duration of the respective RBS-SBS transmissions is determined. This is performed dynamically, i.e. at least partially adaptive to the current asymmetry between said up- and downlink data. Said allocation may preferably be performed by said RBS, but also by said SBS. The allocation of said up- and downlink RBS-SBS transmission periods in said RBS frame structure may also fix said up- and downlink RBS-terminal transmission periods, so that as a result of said allocation step, the complete RBS frame structure my be obtained, which indicates when the RBS transceiver transmits to the SBS or terminal, and when it receives from the SBS or terminal.

Said dynamic allocation may increase the duration of an uplink RBS-SBS transmission period if it is determined that there is more uplink data that is to be transmitted from said terminal to said SBS via said RBS than downlink data. This increase of the duration of said uplink RBS-SBS transmission period may for instance be achieved by reducing the duration of a downlink RBS-terminal transmission period, so that said freed duration can be assigned to said uplink RBS-SBS transmission period.

The RBS-SBS transmission periods are thus dynamically allocated in said RBS frame structure under consideration of the asymmetry of the up- and downlink data that is relayed between the at least one SBS and the at least one terminal, so that, even when the periods in which up- and downlink RBS-terminal transmissions are allowed are predefined for the whole communication system, the RBS-SBS transmission periods still flexibly fill the gaps that exist when a period in which an up- or downlink RBS-terminal transmission is allowed is not completely filled by the actual demand of said transmission. The relaying overhead which is generally encountered with relay stations thus can be effectively reduced by considering the dynamic nature of asymmetry between up- and downlink data transmissions at different RBSs.

According to the method of the present invention, it may be preferred that said step of dynamically allocating said up- and downlink RBS-SBS transmission periods is performed by said at least one RBS. Said RBS then may freely decide when to transmit or receive to/from said at least one SBS and said at least one terminal. The freedom of this choice may be slightly restricted by predefined periods that prescribe when uplink RBS-SBS transmissions and downlink RBS-SBS transmissions are allowed, to prevent the SBS from the necessity to be able to transmit and receive at the same time when several RBSs are assigned to said at least one SBS.

According to the method of the present invention, it may be preferred that said at least one RBS is used to relay up- and downlink data between said at least one SBS and a plurality of terminals. Said RBS thus may serve a plurality of terminals, and may have to take care of the Medium Access Control (MAC) for said plurality of terminals it relays up- and downlink data for, for instance by time division, frequency division, code division or space division multiple access.

According to the method of the present invention, it may be preferred that a first RBS is used to relay up- and downlink data between said at least one SBS and at least a first terminal and that a second RBS is used to relay up- and downlink data between said at least one SBS and at least a second terminal. It may thus be well possible that said at least one SBS uses several RBSs to increase its coverage area.

According to the method of the present invention, it may be preferred that up- and downlink data is also directly transmitted between said at least one SBS and at least one SBS terminal. Said at least one SBS thus may serve one or more so-called SBS terminals directly, and additionally serve a couple of terminals via one or several RBSs.

According to the method of the present invention, it may be preferred that said SBS comprises at least two transceivers, wherein a first of said at least two transceivers is used for said up- and downlink transmissions between said SBS and said at least one RBS, and wherein a second of said at least two receivers is used for said direct up- and downlink transmissions between said SBS and said at least one SBS terminal. It may be advantageous that said at least one SBS is receiving the RBS-SBS transmissions with a separate transceiver, possibly on a different carrier frequency. The SBS-terminal transmissions, which may be defined by a different frame structure than the RBS-SBS transmissions that are defined by said RBS frame structure then may take place concurrently.

According to the method of the present invention, it may be preferred that said at least one RBS comprises at least two sets of physical antenna elements, wherein a first of said at least two sets of physical antenna elements is used for said up- and downlink transmissions between said at least one RBS and said at least one SBS, and wherein a second of said at least two sets of physical antenna elements is used for said up- and downlink transmissions between said at least one RBS and said at least one terminal. It may be advantageous that a first set of said physical antenna elements are placed advantageously for SBS-RBS transmissions, e.g. creating either high signal-to-noise ratio and/or a large number of independent channel paths between said fixed-location RBS and said-fixed location SBS. It may be advantageous that a second set of said physical antenna elements are placed advantageously for RBS-terminal transmissions, e.g. creating seamless coverage over the RBS service area.

According to the method of the present invention, it may be preferred that said uplink transmissions and said downlink transmissions between said at least one RBS and said at least one terminal use the same carrier frequency and are separated in the time domain. This may for instance be the case in a Time Division Duplex (TDD) system, wherein the uplink transmission performed at a different time instance (time slot) than the downlink transmission.

According to the method of the present invention, it may be preferred that said transmissions between said at least one RBS and said at least one terminal and said transmissions between said at least one RBS and said at least one SBS use the same carrier frequency.

According to the method of the present invention, it may be preferred that said transmissions between said at least one RBS and said at least one terminal and said transmissions between said at least one RBS and said at least one SBS use different carrier frequencies. Even if said RBS is only equipped with one transceiver, so that concurrent RBS-SBS transmissions and RBS-terminal transmissions are not possible, it might be advantageous to transmit the RBS-SBS transmissions with a different carrier frequency that matches the carrier frequency, which said at least one SBS prefers to use for said RBS-SBS transmissions. Said RBS-SBS transmissions then do not cause interference to the SBS-terminal transmissions between the SBS and its associated SBS terminals.

According to the method of the present invention, it may be preferred that at least two different RBSs use different orthogonal carriers for their transmissions with said at least one SBS, in particular different carrier frequencies, transmission instances, polarisations, or codes. In order to allow multiple access of the RBS-SBS transmissions said at least one SBS is keeping with different RBSs, it may be necessary for the RBSs to use different carrier frequencies, or different transmission instances, or different polarisations, or different spreading or scrambling codes. The at least one SBS then has to provide means allowing to recover the RBS-SBS transmissions, for instance in the case of different frequency carriers, different transceivers have to be provided at said at least one SBS.

According to the method of the present invention, it may be preferred that at least two different RBSs use different time instances for their transmissions with said at least one SBS, and wherein different transmission time instances are predetermined for different RBSs. Each RBS thus may be assigned a preferred period of time within its RBS frame structure in which up- or downlink RBS-SBS transmissions preferably take place. This may restrict the degrees of freedom of the RBSs to allocate the RBS-SBS transmission periods in said RBS frame structure; however, time-division based multiple access of the different RBSs at the SBS then can be assured. Access of larger numbers of RBSs to the same SBS may be controlled by organising said RBSs in groups and granting said groups and said RBSs within said groups access to said SBSs at different time instances.

According to the method of the present invention, it may be preferred that at least two different RBSs use the same orthogonal carrier for their transmissions with said at least one SBS, and wherein said SBS deploys Space Division Multiple Access (SDMA) techniques to assure the separation of the transmissions of said at least two different RBSs. If two or more RBSs are neither separated in the time, frequency, polarization or code domain in their RBS-SBS transmissions, a collision of said RBS-SBS transmissions at said SBS becomes inevitable. However, the SBS may then deploy an adaptive antenna array and be able to spatially separate the different RBSs by means of SDMA.

According to the method of the present invention, it may be preferred that a network planning process is used to provide sufficient spatial separation between RBS-SBS transmissions of said at least two different RBSs and said at least one SBS.

According to the method of the present invention, it may be preferred that an uplink period, in which uplink transmissions between said at least one RBS and said at least one terminal are allowed to take place, and a downlink period, in which downlink transmissions between said at least one RBS and said at least one terminal can take place, are fixedly defined in said RBS frame structure. For instance, said RBS frame structure may be composed of frames, and one half of each frame may consists of an uplink period, and the other half of the frame of a downlink period. The ratio between the amount of said frame that is occupied by said uplink period and the amount of said frame that is occupied by said downlink period may be indicative of a fixed assumption on the distribution of uplink versus downlink data amount throughout the whole communication system. For instance, the SBS may be only allowed to transmit to its assigned SBS terminals during said downlink period, and to receive from its assigned SBS terminals during said uplink period. The demand that RBS-terminal transmissions are only allowed to take place in said up- and downlink periods is not altered during the allocation of the RBS-SBS transmission periods in said RBS frame structure. However, portions of said up- and downlink periods may be used for RBS-SBS transmissions instead of RBS-terminal transmissions.

According to the method of the present invention, it may be preferred that at least two RBSs are synchronised in a way that said respective uplink and down-link periods in said respective RBS frame structures are equal and that said respective RBS frame structures are temporally aligned. If all SBSs of said communication system are synchronised this is inherited to the RBS stations as well, so that the case that one terminal is transmitting data and one terminal is receiving data concurrently may not occur.

According to the method of the present invention, it may be preferred that said step of dynamically allocating said up- and downlink RBS-SBS transmission periods in said RBS frame structure comprises at least partially overlaying said uplink and/or downlink periods with said up- and/or downlink RBS ↔ SBS transmission periods. Said up- and downlink periods only define when RBS-terminal transmissions are allowed to take place, but they do not prescribe that they have to take place during the complete up- and downlink periods, in particular if there is not enough data to be transmitted in the respective uplink or downlink transmission. RBS-SBS transmissions and RBS-terminal transmissions may have to share the single transceiver of an RBS. If said communication system defines uplink and downlink periods of the transmissions between the SBS and its assigned SBS terminals, and if synchronism between the SBSs and the RBSs is desired, these uplink and downlink periods then also apply for the RBS frame structure. However, synchronism is not affected by allowing the transmissions between SBS and RBS to take place in said up- or downlink periods. Thus in said step of allocating, the up- and downlink RBS-SBS transmission periods may be arranged in said RBS frame structure so that they overlap with said up- and downlink periods or are completely contained in said up- and/or downlink periods.

According to the method of the present invention, it may be preferred that said asymmetry between said up- and downlink data relayed between said at least one SBS and said at least one terminal via said at least one RBS is considered in said step of dynamically allocating said up- and downlink RBS-SBS transmission periods in said RBS frame structure by increasing said overlaid uplink portion if there is more data to be transmitted in said downlink transmission between said at least one RBS and said at least one terminal as compared to said uplink transmission, and increasing said overlaid downlink portion if there is more data to be transmitted in said uplink transmission between said at least one RBS and said at least one terminal as compared to said downlink transmission. Said overlaid portions may define portions of up- or downlink periods in which respective up- and downlink transmissions are allowed, but do not actually take place. For instance, if an uplink period comprises 50% of a frame (and a downlink period comprises the remaining 50% of the frame), because throughout the communication system, it is assumed that the amount of uplink data and downlink data are equal, but the actual data load at the SBS that serves the RBS is different in that more downlink data than uplink data is to be relayed to said at least one terminal via said RBS, the uplink portion, which is not completely exploited by the uplink transmission, is reduced by increasing the overlaid uplink portion. The overlaid uplink portion then may be used by said up- and downlink RBS-SBS transmissions.

According to the method of the present invention, it may be preferred that in the first case, said uplink portion is at least partially overlaid with said downlink RBS-SBS transmission period, and wherein in the second case, said downlink portion is at least partially overlaid with said uplink RBS-SBS period.

According to the method of the present invention, it may be preferred that periods in said RBS frame structure in which said uplink RBS-SBS transmission periods and said downlink RBS-SBS transmission periods can be allocated are either fixed or signaled to said at least one RBS by said at least on SBS. In this way, periods in which RBS-SBS uplinks and downlinks are allowed to take place may be defined for at least all RBSs that are assigned to the same SBS, in order to avoid that the SBS has to be capable of transmitting and receiving concurrently.

According to the method of the present invention, it may be preferred that said frame structure consists of a temporal sequence of super frames, wherein each super frame comprises at least one uplink RBS-terminal period, at least one downlink RBS-terminal period, and either at least one RBS-SBS uplink period or at least one RBS-SBS downlink period.

According to the method of the present invention, it may be preferred that said up- and downlink RBS-terminal period take turns from superframe to superframe.

According to the method of the present invention, it may be preferred that said uplink transmissions and said downlink transmissions between said at least one RBS and said at least one terminal take place at least partially in parallel and are separated in the frequency domain by using at least two carrier frequencies. The RBSs then use Frequency Division Duplex (FDD) to separate uplink and downlink transmission, which take place in parallel.

According to the method of the present invention, it may be preferred that said uplink transmissions between said at least one RBS and said at least one terminal and said downlink transmissions between said at least one RBS and said at least one SBS at least temporarily use the same carrier frequency, and wherein said downlink transmissions between said at least one RBS and said at least one terminal and said uplink transmissions between said at least one RBS and said at least one SBS at least temporarily use the same carrier frequency. It may for instance be preferred that an uplink RBS-terminal transmission uses a first carrier frequency for a certain period, and then a downlink RBS-SBS transmission uses said first carrier frequency for a certain period, whereas in parallel, a second carrier frequency is used by a downlink RBS-terminal transmission and an uplink RBS-SBS transmission.

According to the method of the present invention, it may be preferred that said at least two frequencies used by a first RBS to separate said respective uplink and downlink transmissions and said at least two frequencies used by a second RBS to separate said respective uplink and downlink transmissions are pairwise different. Thus neither the uplink carrier frequencies of both RBSs nor the downlink carrier frequencies of both RBSs are equal, so that said at least one SBS may require four additional transceivers only for the RBS-SBS transmissions with said two RBSs. However, the RBS-SBS transmissions then do not mutually interfere.

According to the method of the present invention, it may be preferred that said at least two frequencies used by a first RBS to separate said respective uplink and downlink transmissions and said at least two frequencies used by a second RBS to separate said respective uplink and downlink transmissions are pairwise equal. Thus the uplink carrier frequencies of both RBSs and the downlink carrier frequencies of both RBSs are equal, so that only two additional transceivers are required at the SBS for the RBS-SBS transmissions with said two RBSs. However, other steps then have to be taken to separate the RBS-SBS transmissions, for instance SDMA or Code Division multiple access may be applied to separate the RBS-SBS transmissions of said two RBSs.

According to the method of the present invention, it may be preferred that uplink transmissions and downlink transmissions between said at least one SBS and at least one SBS terminal take place at least partially in parallel and are separated in the frequency domain by using at least two carrier frequencies.

According to the method of the present invention, it may be preferred that said at least two frequencies used by said at least one RBS to separate said respective uplink and downlink transmissions and said at least two frequencies used by said at least one SBS to separate said respective uplink and downlink transmissions are pairwise different. The SBS then requires two transceivers for its own SBS-terminal transmissions and two transceivers for the RBS-SBS transmissions with each RBS.

According to the method of the present invention, it may be preferred that said at least two frequencies used by said at least one RBS to separate said respective uplink and downlink transmissions and said at least two frequencies used by said at least one SBS to separate said respective uplink and downlink transmissions are pairwise equal. Then only two transceivers are required at the SBS.

According to the method of the present invention, it may be preferred that said SBS uses SDMA techniques to separate the concurrent transmissions that use the same carrier frequencies.

According to the method of the present invention, it may be preferred that a network planning process is used to provide sufficient spatial separation between said concurrent transmissions that use the same carrier frequencies.

According to the method of the present invention, it may be preferred that an uplink period, in which uplink transmissions between said at least one RBS and said at least one terminal are allowed to take place, and a downlink period, in which downlink transmissions between said at least one RBS and said at least one terminal are allowed to take place, are fixedly defined in said RBS frame structure. Said RBS frame structure may for instance consist of a sequence of frames for each of the two carrier frequencies, respectively, wherein each frame corresponds to one of said uplink or downlink periods, and wherein said uplink periods are assigned to the frames of the first carrier frequency, and the downlink periods are assigned to the frames of the second carrier frequency, or wherein the frames of both carrier frequencies are assigned uplink and downlink periods in an alternating fashion. The prescription of uplink and downlink periods may be the same for all RBS frame structures and may stem from the prescription of uplink and downlink periods of said communication system, which aims at a synchronised transmission and reception of the terminals in each of the two carrier frequencies. However, as in the TDD case, the up- and downlink periods only prescribe that either up- or downlink RBS-terminal transmissions are allowed to take place in said up- and downlink periods, not that they necessarily have to, so that once again gaps or free periods arise when the actual uplink/downlink data distribution differs from the specification of the communication system that may have led to the definition of said uplink and downlink periods. These gaps can be efficiently assigned to RBS-SBS transmissions during said step of dynamic allocation.

According to the method of the present invention, it may be preferred that said asymmetry between said up- and downlink data relayed between said at least one SBS and said at least one terminal via said at least one RBS is considered in said step of dynamically allocating said up- and downlink RBS-SBS transmission periods in said RBS frame structure by increasing said overlaid uplink portion if there is more data to be transmitted in said downlink transmission between said at least one RBS and said at least one terminal as compared to said uplink transmission, and increasing said overlaid downlink portion if there is more data to be transmitted in said uplink transmission between said at least one RBS and said at least one terminal as compared to said downlink transmission. Possibly unused portions of the uplink periods then are used by downlink RBS-SBS transmissions, i.e. a load shift towards larger amounts of downlink data and less amounts of uplink data is compensated by filling the gap in the uplink period with a downlink RBS-SBS transmission period.

According to the method of the present invention, it may be preferred that said uplink portion is at least partially overlaid with said downlink RBS-SBS transmission period, and wherein in the second case, said downlink portion is at least partially overlaid with said uplink RBS-SBS period.

According to the method of the present invention, it may be preferred that on each of said at least two carrier frequencies that are used for the separation of said uplink transmissions and said downlink transmissions between said at least one RBS and said at least one terminal, said uplink and downlink periods take place in an alternating fashion. The alternating fashion of up- and downlinks of the RBS-terminal transmissions causes up- and downlinks to be performed with the same carrier frequency and thus allows the RBS to estimate channel parameters during the uplink transmissions that then may be exploited in MIMO techniques during the downlink transmissions. The only remaining problem for the application of MIMO techniques with accurate channel parameter estimates then is the time-variance of the channel parameters, which is at best mitigated by the uplink and downlink transmissions taking turns. The same holds for the estimation of channel parameters and the application of MIMO techniques for the RBS-SBS transmissions, the up- and downlinks of which then alternate as well, as it is demanded that uplink RBS-SBS transmission periods may only overlay downlink periods and that downlink RBS-SBS portions may only overlay uplink periods.

According to the method of the present invention, it may be preferred that at least two RBSs are synchronised, in a way that said respective uplink and downlink periods in said respective RBS frame structures are equal and that said respective RBS frame structures are temporally aligned. Synchronization of the uplink and downlink periods of the different RBSs ensures that during uplink periods, only downlink RBS-SBS transmissions are transmitted from said SBS, and that during said downlink periods, only uplink RBS-SBS transmissions are received at said RBS, so that the estimation of channel parameters on the RBS-SBS uplink and the application of MIMO techniques on the RBS-SBS downlink is simplified.

According to the method of the present invention, it may be preferred that Multiple-Input-Multiple-Output (MIMO) techniques are used for the transmissions between said at least one RBS and said at least one SBS and/or between said at least one SBS and said at least one SBS terminal and/or between said at least one RBS and said at least one terminal. Said MIMO techniques may be based on adaptively estimated channel parameters or on a-priori knowledge of channel parameters. Said MIMO may be applied on the transmitter side only, or on the receiver side only, or jointly on both sides of the respective propagation channel. Said MIMO techniques may incorporate spatial and/or spatio-temporal beamforming, maximum ratio combining, optimum combining for both frequency-flat and frequency-selective channels. It might also be envisaged to transmit on the eigenmodes of the channel.

According to the method of the present invention, it may be preferred that a network planning process is used to provide advantageous multipath characteristics for employing MIMO techniques between said at least one SBS and said at least one RBS.

According to the method of the present invention, it may be preferred that said MIMO techniques are based on the adaptive estimation of channel parameters under exploitation of the alternating occurrence of uplink and downlink on the same frequency carrier for the transmissions between the at least one RBS and the at least one SBS and/or the transmissions between the at least one RBS and the at least one terminal and/or the transmissions between the at least one SBS and the at least one SBS terminal.

According to the method of the present invention, it may be preferred that on a first of said at least two carrier frequencies that are used for the separation of said uplink transmissions and said downlink transmissions between said at least one RBS and said at least one terminal, said uplink transmissions take place, and wherein on a second of said at least two carrier frequencies, said downlink transmissions take place. Software overhead may be significantly reduced if there is a fixed relationship between carrier frequency up- and downlink period.

According to the method of the present invention, it may be preferred that at least two RBSs are not synchronised, in a way that said respective uplink and downlink periods in said respective RBS frame structures are equal but that said respective RBS frame structures are not temporally aligned. The need for synchronization among the RBSs may be relaxed when there are only uplink periods on a first carrier frequency (and downlink RBS-SBS transmission periods overlaying them) and downlink periods in a second carrier frequency (and uplink RBS-SBS transmission periods overlaying them). On said first carrier frequency, said at least one SBS then transmits to RBSs, and on said second carrier frequency, said at least one SBS receives from RBSs. The case that concurrent transmission and reception of said at least one SBS on one of said carrier frequencies is required then can not occur. However, due to the frequency separation between uplink and downlink of the RBS-SBS transmissions, accurate estimation of channel parameters may be aggravated, and MIMO techniques may become less efficient.

According to the method of the present invention, it may be preferred that a handover of said at least one RBS from a first SBS to a second SBS is possible, and wherein handover parameters are signaled between said at least one RBS, said first SBS and said second SBS. In particular, timing, antenna parameters and rules valid at the second SBS may be signaled. It may be further necessary that both the SBSs and the RBS are capable of adaptive beamforming in order to be able to adjust the antenna characteristic to the peer SBS/RBS.

According to the method of the present invention, it may be preferred that said up- and downlink data is relayed between said at least one SBS and said at least one terminal via n RBSs, where n is an integer number equal to or larger than 2. Said up- and downlink data thus may be relayed on at least two hops, e.g. on the downlink, first from the SBS to the first RBS, then to the second RBS, and finally to the at least one terminal.

According to the method of the present invention, it may be preferred that data of one link direction is relayed between said at least one SBS and said at least one terminal via n RBS, where n is an integer number equal to or larger than 1, and wherein data of the other link direction is transmitted between said at least one SBS and said at least one terminal via m RBS, wherein m is an integer number between 0 and n−1. The number of hops may be different one the up- and downlink, for instance to speed up TCP/IP acknowledgement procedures.

According to the method of the present invention, it may be preferred that the decision whether a terminal becomes said at least one SBS terminal or not is also based on delay requirements of active applications in said terminal.

According to the method of the present invention, it may be preferred that a first terminal and a second terminal communicate during said uplink and/or downlink RBS-SBS transmission periods. Said RBS-SBS transmission periods may be exploited by a first terminal to transmit to or receive from a second terminal. Said communication may be de-centrally organised by said terminals or scheduled by said RBSs and may use the same air interface that is used for the RBS-terminal transmissions or a different air interface.

It may be preferred that the maximum output power in the communication between said first terminal and said second terminal is limited to a lower level than in the RBS-terminal transmission. The limitation may be pre-programmed into said terminals or signalled by the network.

According to the method of the present invention, it may be preferred that said network infrastructure allocates spreading codes for said direct communication between said terminals and said peripherals in order to mitigate the harmful effects of interference.

According to the method of the present invention, it may be preferred that said at least one terminal communicates with its peripherals during said uplink and/or downlink RBS-SBS transmission periods. Said peripherals may for instance be supplementary electronic devices such as multimedia devices, computers, PDAs or similar. Said communication may be de-centrally organised by said terminal and may use the same air interface that is used for the RBS-terminal transmissions or a different air interface.

It may be preferred that the maximum output power in the communication between said terminal and its peripherals is limited to a lower level than in the RBS-terminal transmission. The limitation may be pre-programmed into said terminal and its peripherals or be signalled by the network.

According to the method of the present invention, it may be preferred that for said transmissions between said at least one RBS and said at least one SBS, different coding schemes and/or modulation schemes and/or packet structures are used as for said transmissions between said at least one RBS and said at least one terminal or said transmissions between said at least one SBS and said at least one SBS terminal. Said coding or modulation schemes or packet structures may account for a higher signal-to-noise-and-interference ratio on the link between the RBS and the SBS, which may for instance be due to the use of MIMO techniques, or for higher processing powers, or due to advantageous placing of said RBS and SBS as compared to said terminals.

It is further proposed a computer program with instructions operable to cause a processor to perform the above-mentioned method steps.

It is further proposed a computer program product comprising a computer program with instructions operable to cause a processor to perform the above-mentioned method steps.

It is further proposed a device for improving the spectral efficiency of a communication system that comprises at least one Super Base Station SBS and at least one terminal, wherein at least one Relay Base Station RBS is used to relay up- and downlink data between said at least one Super Base Station SBS and said at least one terminal, and wherein a start and a duration of up- and downlink RBS-terminal transmission periods, in which up- and downlink transmissions between said at least one RBS and said at least one terminal take place, and a start and a duration of up- and downlink RBS-SBS transmission periods, in which up- and downlink transmissions between said at least one RBS and said at least one SBS take place, are defined by an RBS frame structure, said device comprising means for dynamically allocating said up- and downlink RBS-SBS transmission periods in said RBS frame structure under consideration of an asymmetry between said up- and downlink data relayed between said at least one SBS and said at least one terminal via said at least one RBS.

Said device may for instance be a part of an RBS or SBS or of the core network of said communication system.

It is further proposed a communication system, comprising at least one Super Base Station SBS, at least one terminal, and at least one Relay Base Station RBS, wherein said RBS is used to relay up- and downlink data between said at least one SBS and said at least one terminal, wherein a start and a duration of up- and downlink RBS-terminal transmission periods, in which up- and downlink transmissions between said at least one RBS and said at least one terminal take place, and a start and a duration of up- and downlink RBS-SBS transmission periods, in which up- and downlink transmissions between said at least one RBS and said at least one SBS take place, are defined by an RBS frame structure, and wherein said up- and downlink RBS-SBS transmission periods are dynamically allocated in said RBS frame structure under consideration of an asymmetry between said up- and downlink data relayed between said at least one SBS and said at least one terminal via said at least one RBS. It is further proposed a terminal in a communication system that comprises at least one Super Base Station SBS and at least one terminal, wherein at least one Relay Base Station RBS is used to relay up- and downlink data between said at least one SBS and said at least one terminal, and wherein a start and a duration of up- and downlink RBS-terminal transmission periods, in which up- and downlink transmissions between said at least one RBS and said at least one terminal take place, and a start and a duration of up- and downlink RBS-SBS transmission periods, in which up- and downlink transmissions between said at least one RBS and said at least one SBS take place, are defined by an RBS frame structure, and wherein said up- and downlink RBS-SBS transmission periods are dynamically allocated in said RBS frame structure under consideration of an asymmetry between said up- and downlink data relayed between said at least one SBS and said at least one terminal via said at least one RBS.

It is further proposed a Relay Base Station RBS in a communication system that comprises at least one Super Base Station SBS and at least one terminal, wherein said RBS is used to relay up- and downlink data between said at least one SBS and said at least one terminal, and wherein a start and a duration of up- and downlink RBS-terminal transmission periods, in which up- and downlink transmissions between said RBS and said at least one terminal take place, and a start and a duration of up- and downlink RBS-SBS transmission periods, in which up- and downlink transmissions between said RBS and said at least one SBS take place, are defined by an RBS frame structure, said RBS comprising means for dynamically allocating said up- and downlink RBS-SBS transmission periods in said RBS frame structure under consideration of an asymmetry between said up- and downlink data relayed between said at least one SBS and said at least one terminal via said RBS.

It is further proposed a Super Base Station SBS in a communication system, wherein at least one Relay Base Station RBS is used to relay up- and downlink data between said SBS and at least one terminal, wherein a start and a duration of up- and downlink RBS-terminal transmission periods, in which up- and downlink transmissions between said at least one RBS and said at least one terminal take place, and a start and a duration of up- and downlink RBS-SBS transmission periods, in which up- and downlink transmissions between said at least one RBS and said SBS take place, are defined by an RBS frame structure, and wherein said up- and downlink RBS-SBS transmission periods are dynamically allocated in said RBS frame structure under consideration of an asymmetry between said up- and downlink data relayed between said at least one SBS and said at least one terminal via said at least one RBS.

These and other aspects of the invention will be apparent from and elucidated with reference to the embodiments described hereinafter.

DETAILED DESCRIPTION OF THE INVENTION

Figure 1:
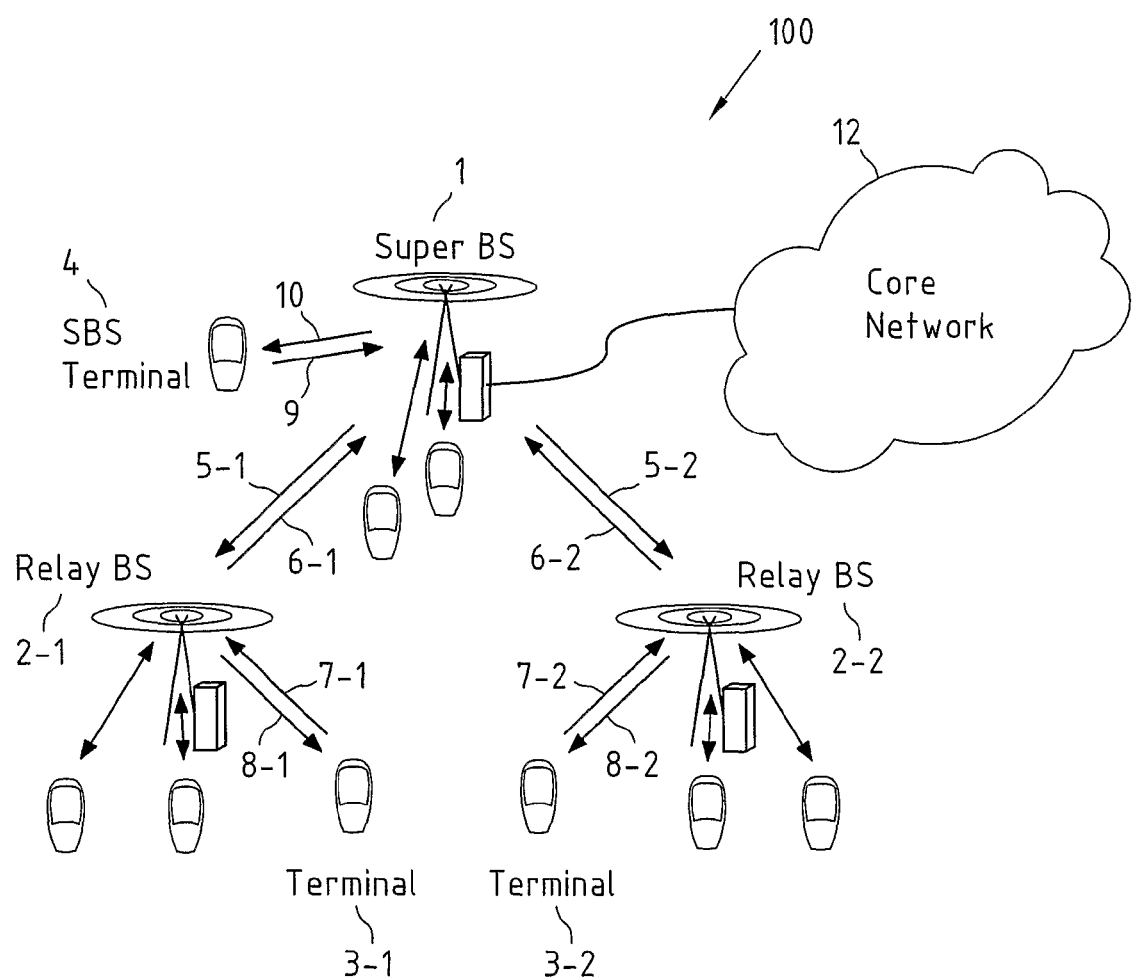
FIG. 1: A schematic representation of a communication system with Relay Base Stations (RBSs) according to the present invention.

FIG. 1 is a schematic representation of a communication system 100 with Relay Base Stations (RBSs) 2-1 and 2-2 according to the present invention. Up- and downlink data that is to be transmitted from Super Base Station SBS 1 to terminal 3-1, wherein terminal 3-1 is out of the coverage area of the SBS 1, is relayed via the RBS 2-1. On the downlink, thus downlink data is transmitted from said SBS 1 to said RBS 2-1 in a downlink RBS-SBS transmission 6-1, and then from RBS 2-1 to terminal 3-1 in a downlink RBS-terminal transmission 8-1. Similarly, on the uplink, terminal 3-1 first transmits to RBS 2-1 in an uplink RBS-terminal transmission 7-1, and then RBS 2-1 transmits to SBS 1 in an uplink RBS-SBS transmission 6-1.

As exemplarily depicted in FIG. 1, the SBS 1 may use several RBS 2-1, 2-2 to transmit data to several terminals 3-1, 3-2 that are actually out of range. Each RBS may be capable of relaying several data transmissions between the SBS 1 and several terminals. Also relaying the data from the SBS 1 to a terminal 3-1 via several RBSs is possible. If propagation conditions dramatically change, an RBS may also be handed over from a first SBS to a second SBS. The SBS may also directly serve terminals, as is exemplarily depicted with SBS terminal 4, which communicates with the SBS via uplink transmissions 9 and downlink transmissions 10. The decision whether a terminal is served by an RBS or is directly served by the SBS and thus is denoted as SBS terminal may depend on the quality of service parameters that are demanded by said terminal, in particular by the delay requirements of active applications that run in said terminal. As can be further seen from FIG. 1, only the SBS 1 has a fixed access 1 to the core network 12 of the communication system 100, i.e. the deployment of the RBSs is possible on a flexible basis without dramatically increasing the deployment costs of the communication system. According to the present invention, the RBS-SBS transmissions 5-1 and 6-1 use the same air interface as the RBS-terminal transmissions 7-1 and 8-1 and the SBS-terminal transmission 9 and 10. Thus no hard- and software changes are required for the terminals 3-1 that are served by the RBS 2-1. In effect, these terminals 3-1 do not even notice that they are served by an RBS 2-1 instead of an SBS 1. In particular, it may be envisaged that the RBS-SBS transmissions 5-1 and 6-1 and the RBS-terminal transmissions 7-1 and 8-1 use the same RBS transceiver(s). In a TDD system, the single transceiver then is used in time multiplex by uplink and downlink RBS-SBS transmissions and RBS-terminal transmission, whereas in a FDD system, the two transceivers (one for each carrier frequency), are use in time multiplex by RBS-SBS transmissions and RBS-terminal transmissions. Thus hardware requirements for the RBS 2-1 can be kept low.

The introduction of the RBS 2-1 offers the chance to break up a fixed allocation of transmission resources for the uplink on the one hand and the downlink on the other hand. For instance, in a TDD system according to the present invention, generally a fixed percentage of a frame will be reserved for uplink traffic, and the remaining part of the frame will be reserved for the downlink traffic (parts of the frame that are used for broadcast or contention phases are not considered here, i.e. only the parts of the frame carrying uplink and downlink data are considered). If the SBS directly transmits to a terminal 3-1, and if the actual amount of uplink data as compared to the amount of downlink data grossly deviates from the average ratio that is specified for the communication system, there exists no dynamic possibility to shift transmission resources towards the link direction that actually requires transmission resources. However, by introducing the RBS, not only the coverage area of the SBS is enhanced, but also said deviation from the average ratio of uplink data to downlink data can be mitigated by assigning the RBS-SBS transmissions transmission resources that become available due to the deviation of the actual traffic constellation. Thus, also data effectively has to be transmitted twice to reach the terminal 3-1, the dynamic allocation of transmission resources under consideration of the actual asymmetry between the up- and downlink data helps to let at least the RBS-SBS transmissions use transmission resources that would be wasted otherwise.

To further enhance performance, it may be preferred that the RBS uses two sets of physical antenna elements, a first one for said up- and downlink transmissions between said RBS and said SBS, and a second one for said direct transmissions between said RBS and its associated terminals. Said first set of antenna elements may then increase the signal-to-noise ratio between said fixed-location RBS and said fixed-location SBS, or contribute to the introduction of multiple spatial transmission channels between them both in the sense of SDMA. Said second set of antenna elements then may for instance be arranged to achieve seamless coverage of the RBS service area.

Figure 2:
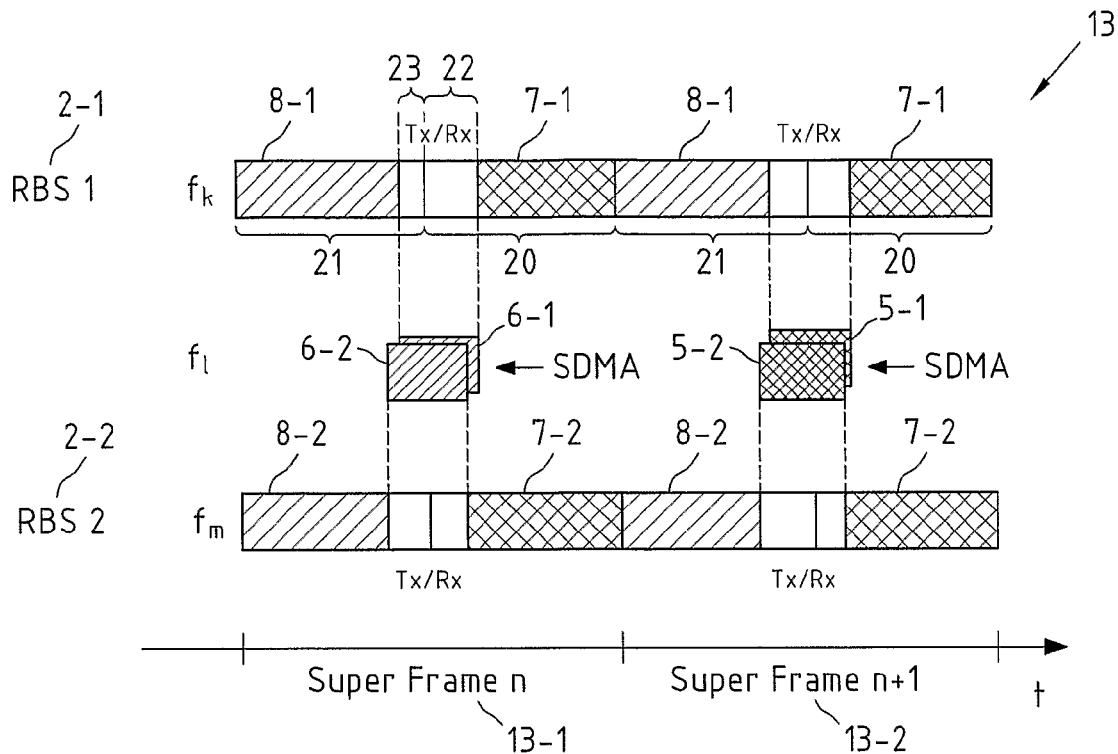
FIG. 2: an RBS frame structure for a TDD mode according to the present invention.
Figure 3:
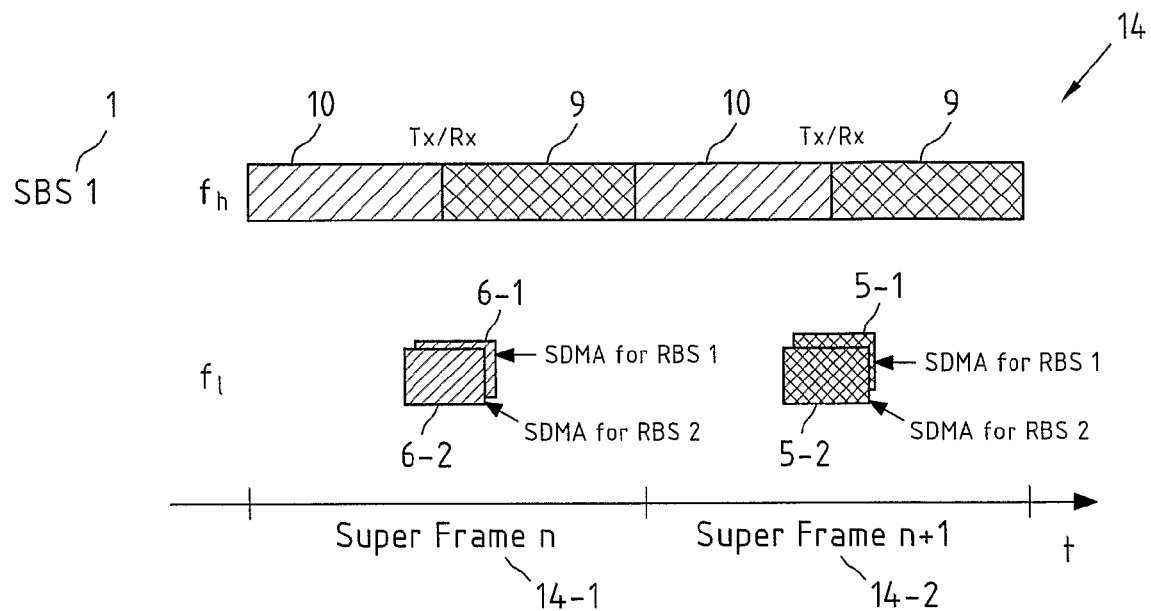
FIG. 3: an SBS frame structure for a TDD mode according to the present invention.

FIG. 2 depicts an RBS frame structure 13 for a TDD mode according to the present invention. The frame structure 13 refers to both a first RBS 2-1 and a second RBS 2-2. As can be readily seen, the RBS-SBS uplink 5-1, 5-2 and downlink 6-1, 6-2 as well as the RBS-terminal uplink 7-1, 7-2 and downlink 8-1, 8-2 for each RBS 2-1, 2-2 are separated in the time domain. Both RBS 2-1 and 2-2 may use an own carrier frequency f, as indicated in FIG. 2, or the same carrier frequency. The use of the same frequencies is may be reasonable when the cells that are formed by the coverage area of the RBSs 2-1 and 2-2 are widely spaced apart so that no inter-cell interference may occur. As further depicted in FIG. 2, the RBS-SBS transmissions 5-1, 5-2 and 6-1, 6-2 may use different carrier frequencies than their corresponding RBS-terminal transmissions 7-1, 8-1 and 7-2, 8-2. This carrier frequency assignment may simplify the communication of the RBSs 2-1 and 2-2 with the SBS 1, in particular if the SBS 1 uses an own transceiver to transmit and receive the RBS-SBS transmissions 5-1, 5-2, 6-1, 6-2 concurrently to the communication with its assigned SBS terminals 4, as is depicted in FIG. 3.

Turning back to FIG. 2, is readily seen that the frame structures 13 of the first RBS 2-1 and second RBS 2-2 are synchronized, i.e. are temporally aligned. Furthermore, uplink 20 and downlink 21 periods are defined in each frame structure, wherein a sequence of one downlink 21 and one uplink 20 period defines a super frame 13-1, 13-2, and wherein said frame structure 13 for each RBS 2-1, 2-2 basically consists of a sequence of such super frames 13-1, 13-2. The uplink periods prescribe in which time periods uplink RBS-terminal transmissions 7-1 are allowed to take place. They are basically inherited from the communication system 100 without RBS stations, where the uplink period then prescribes in which period uplink SBS-terminal transmissions 9 are allowed to take place. The same holds for the downlink periods 21. The aim of the introduction of up- and downlink periods 20, 21 is to ensure that either the terminals or the base stations transmit in a communication system. Otherwise, interference in the cellular communication system would become too large, in particular if for example a terminal is receiving signals from bath a distant base station and also a close-by terminal, so that the desired signals from the base station are corrupted by the unwanted signals from the close-by terminal.

While the demand for a synchronized system may be of great value in a TDD communication system without RBSs, breaking up this demand at least for the RBS-SBS transmissions is of great importance for the present invention. As depicted in FIG. 2, the basic uplink and downlink periods 20, 21 are still observed in the RBS frame structure, i.e. the RBS-terminal transmissions 7-1 and 8-1 still are synchronized with the SBS-terminal transmissions 9, 10 in way that the case that one terminals 3-1, 4 transmits and another terminal 3-1, 4 receives concurrently will not occur. However, parts of the uplink 20 and downlink 21 periods are now used by the RBS-SBS transmissions 5-1, 6-1. When allocating said RBS-SBS transmissions 5-1 and 6-1 in said RBS frame structure 13 of each RBS 2-1 and 2-2, the RBS-SBS transmissions thus overlay parts of the uplink 20 and/or downlink periods 21 and thus define the overlaid uplink portion 22 and the overlaid downlink portion 23. Depending on the actual asymmetry of the up- and downlink traffic, it now may be decided if the allocation of RBS-SBS transmission periods 5-1, 6-1 shall happen more on the expense of the uplink period 20 (then the overlaid uplink portion 22 increases), or on the expense of the downlink portion 21 (then the overlaid downlink portion 23 increases). Thus if there is actually more downlink data to be transmitted from the SBS 1 to a terminal 3-1 via an RBS 2-1, as depicted in FIG. 1, the overlaid uplink portion 22 is increased, the overlaid downlink portion 23 is decreased, and consequently transmission resources from the uplink, which has unused transmission resources available, is dynamically assigned to the RBS-SBS transmission, minimizing its overhead. For RBS 2-2, the opposite case is depicted in FIG. 3, i.e. the overlaid downlink portion is increased because there is actually more uplink data to be transmitted. Said allocation may be freely performed by the RBS itself under the possible constraint that the synchronism of the RBS-terminal transmissions 7-1, 8-1 to the SBS-terminal transmissions 9, 10 may be observed, which, according to FIG. 3, is easily achieved. Note that, although in FIG. 3 only one uplink 20 and one downlink period 21 is defined per super frame 13-1, 13-2, each frame may equally well be composed of several uplink 20 and downlink 21 periods, which may represent time slots that are used for multiple access of several terminals that are relayed via an RBS 2-1.

It may be advantageous to prescribe in which superframe 13-1, 13-2 uplink 5-1 and downlink 6-1 RBS-SBS transmissions are allowed to be performed. This may be signaled to the RBSs 2-1, 2-2 by the SBS 1 or be a priori fixed for the communication system 100.

FIG. 3 depicts the SBS frame structure 14 for a TDD mode according to the present invention that matches the RBS frame structure 13 of FIG. 2. The frame structure 14 of the SBS consists of superframes 14-1, 14-2, wherein each superframe 14-1, 14-2 consists of one uplink period 20 and one downlink period 21, and wherein in said uplink period 20, uplink SBS-terminal transmissions 9 take place, and wherein in said downlink period 21, downlink SBS-terminal transmissions 10 take place. The SBS 1 uses two transceivers with an own carrier frequency each, i.e. the first transceiver is tuned to a carrier frequency for the SBS-terminal transmissions 9, 10 and the second transceiver is tuned to a carrier frequency for the SBS-RBS transmissions 5-1, 5-2, 6-1, 6-2. RBS-SBS transmissions and SBS-terminal transmissions thus can take place without interfering with each other. However, if the RBSs 2-1 and 2-2 use the same carrier frequencies for their RBS-SBS transmissions 5-1, 6-1 and 5-2, 6-2, respectively, and if these transmissions take place at least partially in parallel, as depicted in FIG. 3, the SBS 1 may have to apply Space Division Multiple Access (SDMA) techniques to spatially separate these transmissions. SDMA techniques may be enhanced by a network planning process, for instance a spatio-temporal scheduling instance, which considers which transmissions between the SBS and the RBS are suited for concurrent allocation due to sufficient spatial separation of the involved RBSs or sufficient orthogonality of the spatial channel impulse responses or spatial signatures of the involved RBSs. Other techniques such as assigning the different RBSs different spreading or scrambling codes (Code Division Multiple Access, CDMA), different carrier frequencies (Frequency Division Multiple Access, FDMA), different polarisations (Polarisation Division Multiple Access, PDMA) or transmission instances (Time Division Multiple Access, TDMA), may be applied as well. In particular, the SBS may signal the RBS when RBS-SBS transmissions should optimally be performed, or this scheme may be a priori known to the RBSs. It may also be advantageous to divide the RBSs in groups and to determine in which superframe 14-1, 14-2 the groups of terminals are allowed to perform RBS-SBS transmissions, which then still may be separated by SDMA, FDMA, PDMA in addition to the TDMA component.

Figure 4:
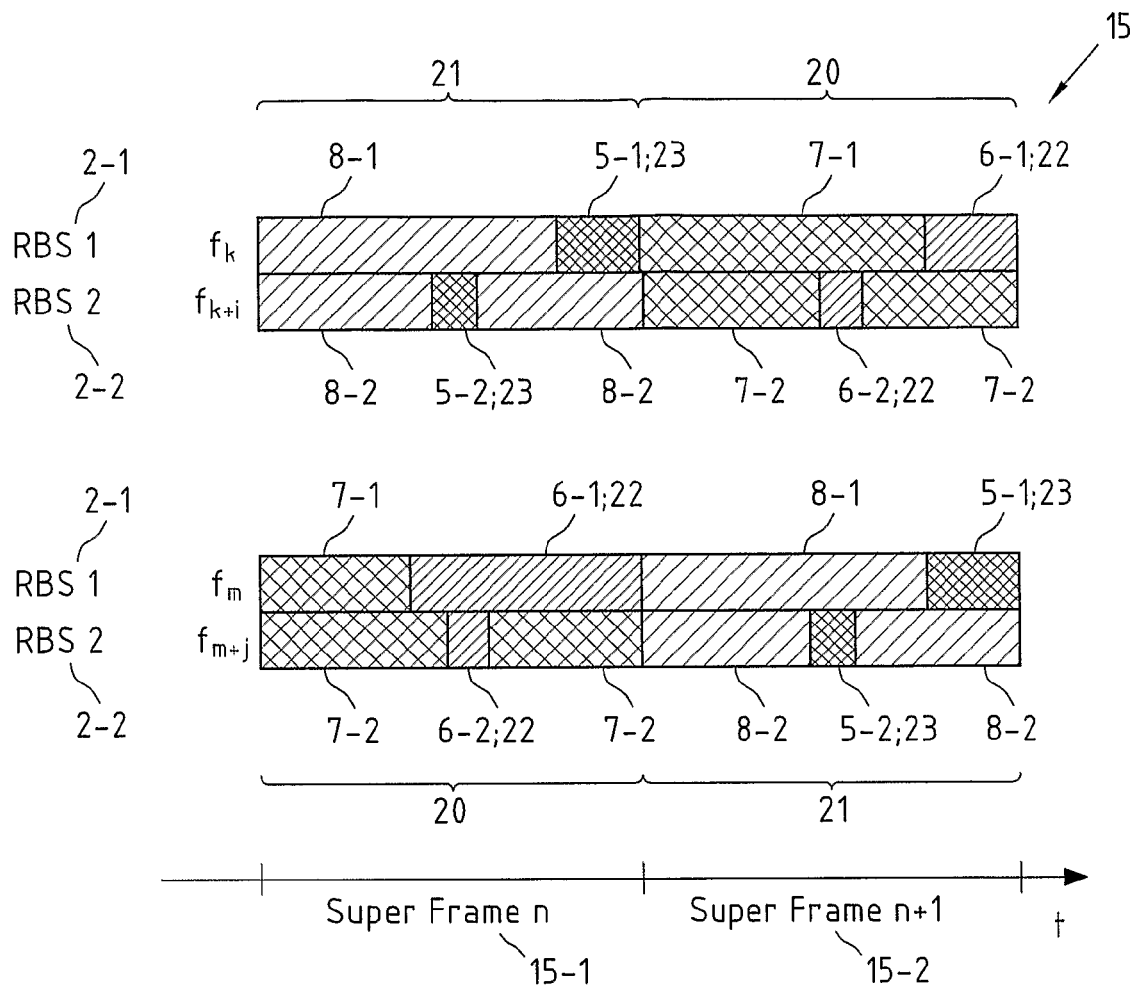
FIG. 4: an RBS frame structure for a synchronized FDD mode according to the present invention.

FIG. 4 depicts an RBS frame structure 15 for a synchronized FDD mode according to the present invention. As for the TDD mode in FIG. 2, the RBS frame structure 15 is shown for two RBSs 2-1 and 2-2. Each RBS 2-1, 2-2 uses two carrier frequencies. Two superframes 15-1 and 15-2 for each RBS 2-1 and 2-2 are shown, and it can be readily seen that the super frames of the RBSs 2-1 and 2-2 are temporally aligned, i.e. the RBSs are temporally synchronized. Furthermore, each superframe 15-1, 15-2 consist of either one uplink portion 20 or one downlink portion 21, respectively. For each carrier frequency of each RBS 2-1, 2-2, uplink 20 and downlink 21 portions alternate when taken over time, and when considering the two carrier frequencies of one RBS 2-1, 2-2, it is evident that in each superframe 14-1, 14-2, one carrier frequency is occupied by an uplink portion 20 and the other carrier frequency is occupied by a downlink portion 21. The RBS-SBS transmission periods 5-1 and 5-2 are now allocated in this frame structure 15 in the following manner: the uplink RBS-SBS transmission periods 5-1 overlay only the downlink periods 21, yielding the overlaid downlink portions 23, and the downlink RBS-SBS transmission periods 6-1 only overlay the uplink periods 20, yielding the overlaid uplink portions 22. Thus not only the uplink 20 and downlink 21 periods alternate from superframe 15-1 to superframe 15-2, but also the RBS-SBS uplink and downlink transmissions 5-1 and 6-1.

The alternating RBS frame structure 15 as depicted in FIG. 4 has the great advantage that, also being applied in an FDD system, the uplinks and downlinks of RBS-terminal and RBS-SBS transmissions are distributed across time and time so that corresponding uplinks and downlinks are performed on the same carrier frequencies. It is thus possible to estimate spatial channel parameters during the reception of signals on the uplink and to use the estimated spatial channel parameters for MIMO techniques such as for instance beamforming during the transmission on the downlink. Thus the frequency-dependence of spatial channel parameters is tackled in an elegant way. Furthermore, the alternating occurrence of up- 20 and downlink 21 periods represents also the most effective way to mitigate the effects of time-variance of the spatial channel parameters.

The demand that uplink RBS-SBS transmission periods 5-1 may only be allocated to downlink periods 8-1 and that downlink RBS-SBS transmission periods 6-1 may only be allocated to uplink periods 7-1 allows to dynamically and efficiently shift the transmission resources from the RBS-terminal transmissions to the RBS-SBS transmissions, for instance, if the uplink has less data to transmit than the downlink, uplink transmission resources represented by the uplink period 20 are available, and are directly absorbed by the downlink RBS-SBS transmission period 6-1, and similarly for the downlink period 21.

Note that, in contrast to the example depicted in FIG. 4, it is also well possible that both RBSs 2-1 and 2-2 use two carrier frequencies that are pairwise identical, i.e. the first frequency carrier of the first RBS 2-1 matches the first frequency carrier of the second RBS 2-2, and the second frequency carrier of the first RBS 2-1 matches the second frequency carrier of the second RBS 2-2. This may require sufficient separation of the cells that are formed by the RBSs 2-1 and 2-2 to avoid interference.

Figure 5:
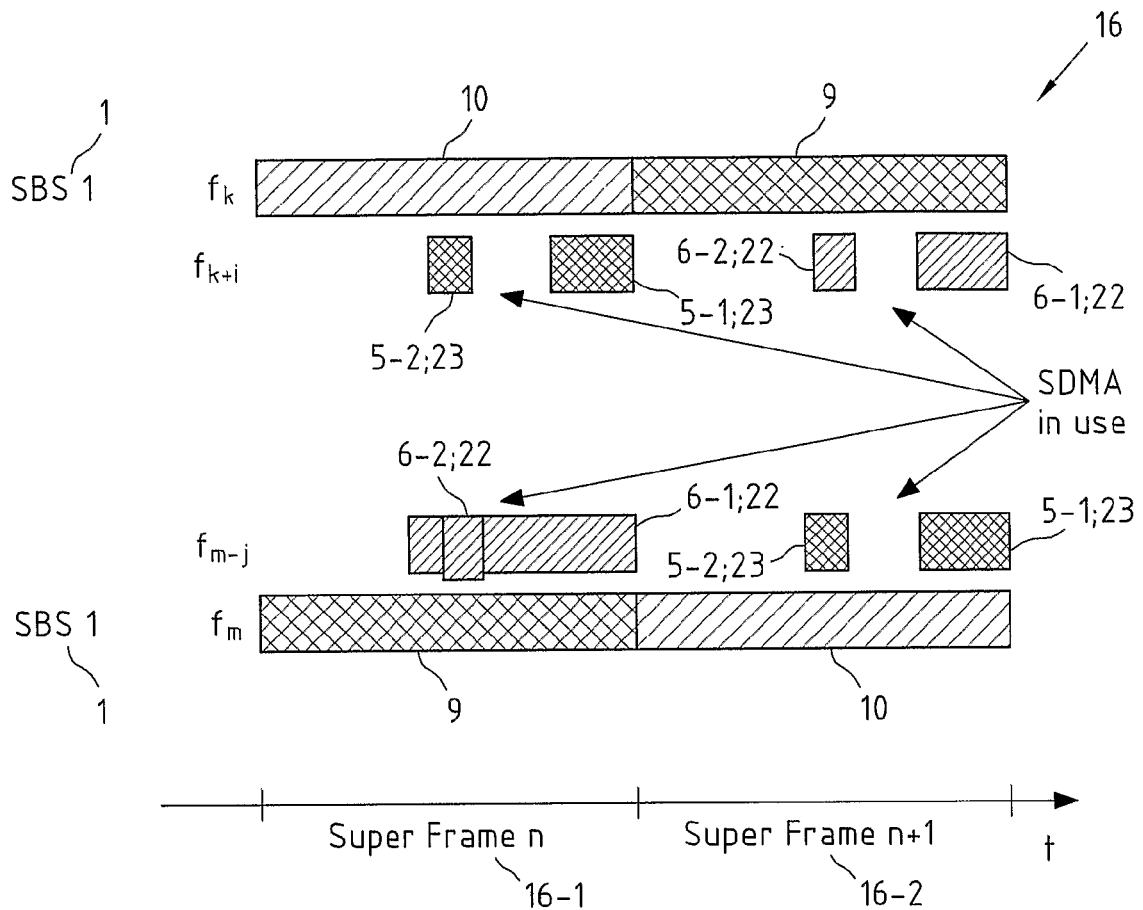
FIG. 5: an SBS frame structure for a synchronized FDD mode according to the present invention.

FIG. 5 depicts an SBS frame structure 16 for a synchronized FDD mode according to the present invention, which corresponds to the FDD frame structure of FIG. 4. The SBS frame structure 14 is composed of superframes 14-1 and 14-2. The SBS 1 uses two carrier frequencies, and on each carrier frequencies, uplink 20 and downlink periods 21 alternate in a way that when on the first carrier frequency an uplink period 20 is present, on the other carrier frequency a downlink period 21 is present. The uplink 20 and downlink 21 periods may be completely used by uplink SBS-terminal transmissions 9 and downlink SBS-terminal transmission 10, respectively. The SBS 1 uses two transceivers that are tuned to the carrier frequencies that are required for the SBS-terminal transmissions 9, 10, and further transceivers to communicate with the RBSs 2-1, 2-2. In the example of FIG. 5, it is assumed that the carrier frequencies of the RBSs 2-1 and 2-2 are pairwise identical, so that the SBS 1 only has to provide two additional transceivers for the communication with the RBSs 2-1 and 2-2, which does not interfere with the SBS-terminal transmissions 9, 10. As can be readily seen from FIG. 5, due to the alternating fashion in which up- 20 and downlink 21 periods appear on the carrier frequencies of each RBS 2-1, 2-2, also the uplinks 5-1, 5-2 and downlinks 6-1, 6-2 of the RBS-SBS transmissions alternate from superframe 16-1 to superframe 16-2. It is thus not necessary for the SBS 1 to be able to transmit and receive on the same frequency. Furthermore, as can be seen from the collision of the downlink RBS-SBS transmissions 6-1 and 6-2 of two different RBSs 2-1 and 2-2, the SBS 1 has to use SDMA or any other multiple access technique to be able to separate RBS-SBS transmissions. Basically, the same techniques as proposed for the TDD examples above apply here, i.e. CDMA, FDMA, PDMA or TDMA may be applied, wherein combinations of these techniques (e.g. the forming of groups of RBSs that are temporally and spatially separate) are well possible.

Figure 6:
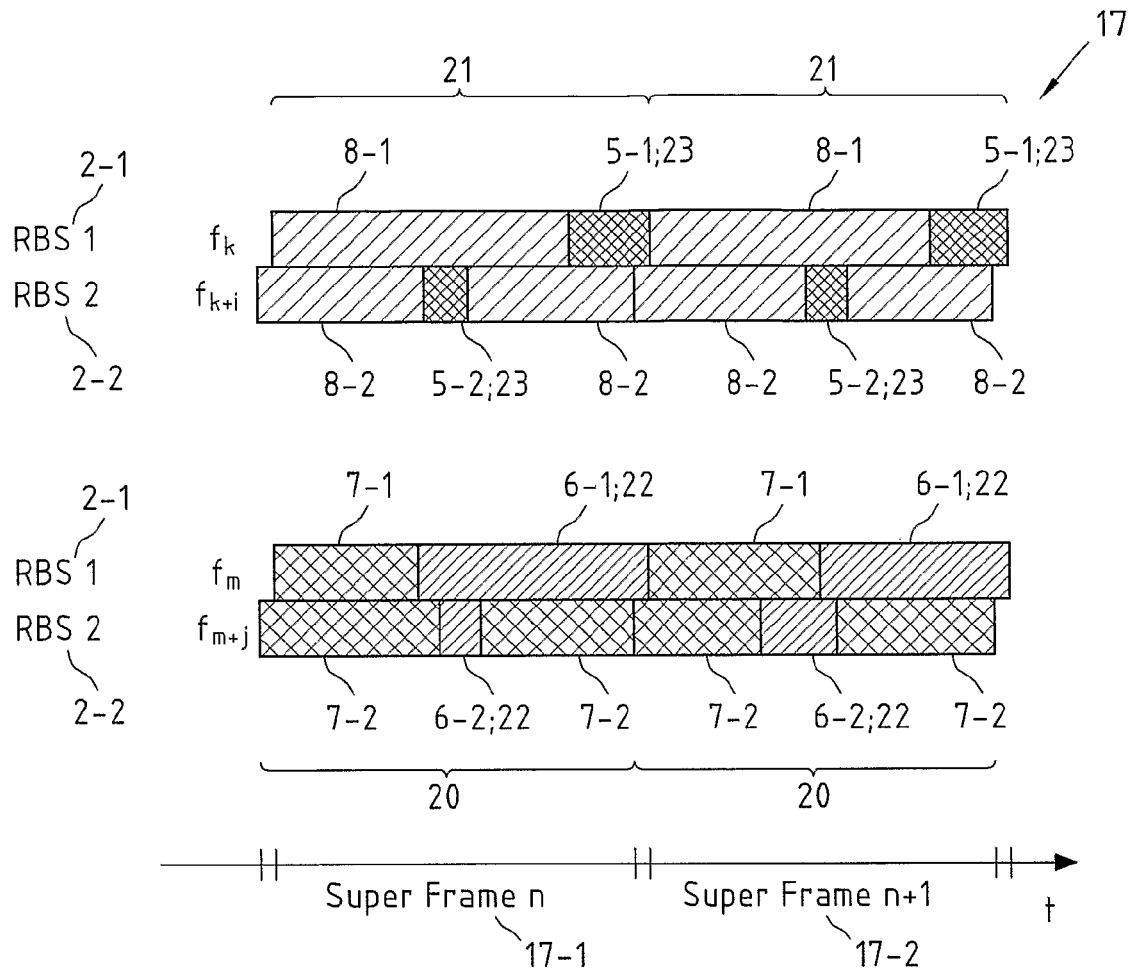
FIG. 6: an RBS frame structure for an unsynchronised FDD mode according to the present invention.

FIG. 6 depicts an RBS frame structure 17 for an unsynchronised FDD mode according to the present invention. In contrast to FIG. 4, the RBS frame structures are no longer aligned. However, the case that one terminal 3-1, 4 transmits and another terminal 3-1, 4 receives on the same carrier frequency is still avoided by demanding that one of the two carrier frequencies of each RBS 2-1, 2-2 only contains uplink periods 21, and the other carrier frequency only uses downlink periods 20, and wherein uplink RBS-SBS 5-1 transmission periods may only overlay downlink periods 21, and wherein downlink RBS-SBS transmission periods 6-1 may only overlay uplink periods 20. Once again, pairwise identical carrier frequencies of the RBSs 2-1 and 2-2 is possible, but then the use of SDMA, CDMA, PDMA or TDMA at the SBS may be required to separate the RBS-SBS transmissions of the RBSs 2-1 and 2-2. The SBS then receives uplink RBS-SBS transmissions 5-1 exclusively on a first carrier frequency and uses a second carrier frequency for the transmission of downlink RBS-SBS transmissions 6-1.

Apparently, due to the fact that uplink and downlink are now separated by a frequency gap for the RBS-terminal transmissions, the RBS-SBS transmissions and the SBS-terminal transmissions, MIMO techniques have to rely or a priori known spatial channel parameters instead of adaptively estimated spatial channel parameters, so that MIMO performance may deteriorate. However, the synchronization requirement is no longer required then.

Figure 7:
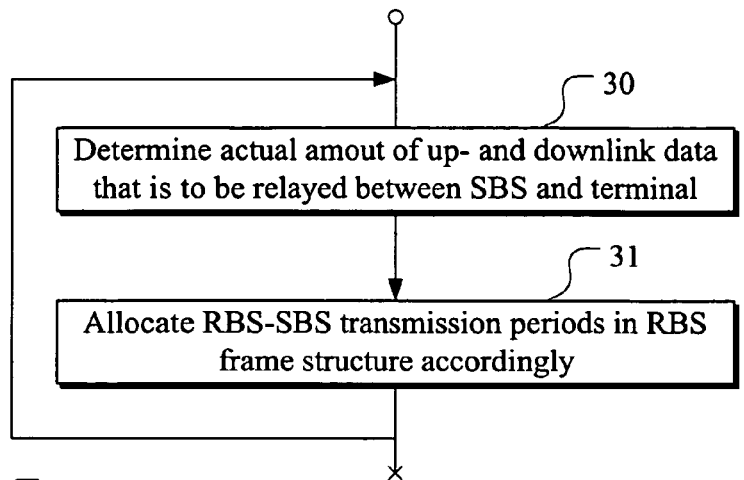
FIG. 7: a flowchart of the method according to the present invention.

FIG. 7 finally depicts a flowchart of the method according to the present invention. In a first step 30, the actual amount of up- and downlink data that is to be relayed between the SBS 1 and the at least one terminal 3-1 is determined. In a second step 31, then the up- and downlink RBS-SBS transmission periods 5-1 and 6-1 are allocated in said RBS frame structure 13, 15, 17 accordingly. Both steps are repeated to allow for a dynamic allocation that keeps track with the changing up- and downlink data traffic.

Figure 8:
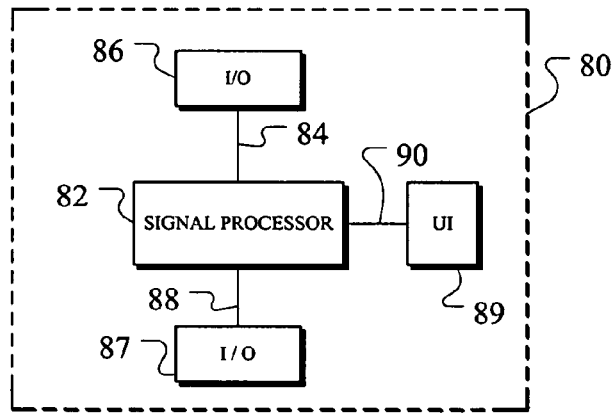
FIG. 8: an illustration of a network element such as a super base station, a relay base station, or a terminal, according to the present invention.

FIG. 8 shows a network element 80 which can serve in the role of a super base station 1, a relay base station 2-1, 2-2, or a terminal 3-1, 3-2, 4. It may include a signal processor 82 connected on a line 84 to a first input/output device 86 and on a line 88 to a second input/output device 87. The network element 80 may also include other elements such as a user interface 89 connected on a line 90 to the signal processor 82. The first and second input/output devices may be interfaced by means of a wireless interface or a hard-wired interface to other network elements, as the case may be. Thus, in case of a wireless interface, the input/output element 86 and/or the input/output device 87 may include an antenna and the necessary transceiver hardware to carry out such a wireless interface. As mentioned previously, there may be a need for multiple transceivers and/or antennas. In the example of a super base station, the first interface 86 may be a hard-wired interface to the core network 12 while the second interface 87 may be a wireless interface to either the terminal 4 or the relay base station 2-1 or 2-2, for instance. If the input/output device interfaces by way of a hard-wired interface, then it would include the necessary hardware to carry out such a hard-wired interface, depending on the protocol employed.

Figure 9:
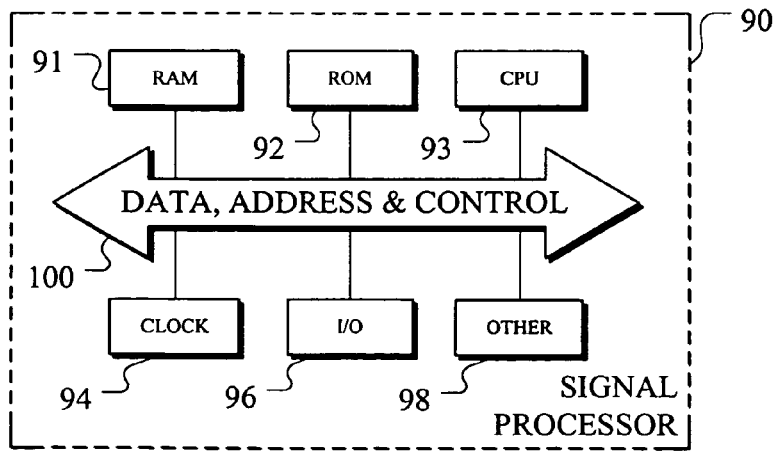
FIG. 9: an example of a signal processor such as the signal processor shown in FIG. 8, according to the present invention.

The signal processor 82 of FIG. 8 can take on many different forms and one example is shown by way of a general purpose signal processor 90 shown in FIG. 9. The signal processor 90 includes various components including a random access memory 91, a read only memory 92, a central processing unit 93, a clock 94, an input/output device 96, and other devices 98 all interconnected by data, address and control lines shown generally at reference numeral 100. It should be realized that the various forms that the signal processor 82 of FIG. 8 can take on can include, without limitation, an integrated circuit (e.g., ASIC, DSP, etc.), discrete components, firmware, hardware, etc.

From the foregoing description of FIGS. 1-7, it will be appreciated by those of skill in the art that the signal processor 82, 90 may be capable of carrying out the method and devices described above, according to the invention. For instance, the device 80 and especially the signal processor 82, 90 will include various components (which may be embodied as described in software, hardware, or the like) including a component for dynamically allocating the up link and down link transmission periods in the relay base station under consideration of an asymmetry between the uplink and downlink data relayed between at least one super base station and at least one terminal via the relay base station. The signal processor 90 of FIG. 9 will be able to do this by virtue of a computer program product resident in the read only memory 92 and encoded according to a computer programming language to carry out the described methodology. The central processing unit 93 in conjunction with other components such as the random access memory 91 will execute the instructions stored on the read only memory 92 and operate according to the processes described above.

The invention has been described above by means of embodiments. It should be noted that there are alternative ways and variations which are obvious to a skilled person in the art and can be implemented without deviating from the scope and spirit of the appended claims. In particular, the presented deployment of an RBS is by no means restricted to wireless communication systems only, it may equally well be applied in systems that are based on wired or optical or acoustical connections. Furthermore, although the examples concentrated on systems with only one hop from the SBS to the terminal, the same principles may be applied to systems wherein the data is relayed via several RBS. The number of RBS-hops in the up- and downlink furthermore does not necessarily have to be the same. During the relay transmission between the SBS and the RBSs, it may be possible that terminals use transmission resources to communicate with each other or with their peripherals, where is may be advantageous that these communications use a reduced amount of transmission power as compared to said RBS-terminal transmissions, which is possible due to the reduced distance between the terminal and other terminals and its peripherals.

The invention claimed is:

1. Method for allocation of transmission periods in a communication system that comprises at least one super base station, at least one terminal and at least one relay base station that is useable to relay up- and downlink data between said at least one super base station and said at least one terminal, a start and a duration of up- and downlink relay base station-terminal transmission periods, in which up- and downlink transmissions between said at least one relay base station and said at least one terminal take place, and a start and a duration of up- and downlink relay base station-super base station transmission periods, in which up- and downlink transmissions between said at least one relay base station and said at least one super base station take place, defined by a relay base station frame structure, said method comprising:

dynamically allocating said up- and downlink relay base station-super base station transmission periods in said relay base station frame structure under consideration of an asymmetry between said up- and downlink data relayed between said at least one super base station and said at least one terminal via said at least one relay base station, wherein an uplink period, in which uplink transmissions between said at least one relay base station and said at least one terminal can take place, and a downlink period, in which downlink transmissions between said at least one relay base station and said at least one terminal are allowed to take place, are fixedly defined in said relay base station frame structure, wherein said dynamically allocating said up- and downlink relay base station-super base station transmission periods in said relay base station frame structure comprises at least partially overlaying said uplink and/or downlink periods with said up- and/or downlink relay base station-super base station transmission periods, and wherein said asymmetry between said up- and downlink data relayed between said at least one super base station and said at least one terminal via said at least one relay base station is considered in said dynamically allocating said up- and downlink relay base station-super base station transmission periods in said relay base station frame structure by increasing said overlaid uplink portion if there is more data to be transmitted in said downlink transmission between said at least one relay base station and said at least one terminal as compared to said uplink transmission, and increasing said overlaid downlink portion if there is more data to be transmitted in said uplink transmission between said at least one relay base station and said at least one terminal as compared to said downlink transmission.

2. The method according to claim 1, wherein said dynamically allocating said up- and downlink relay base station-super base station transmission periods is performed by said at least one relay base station.

3. The method according to claim 1, wherein up- and downlink data is also directly transmitted between said at least one super base station and at least one super base station terminal.

4. The method according to claim 1, wherein said uplink transmissions and said downlink transmissions between said at least one relay base station and said at least one terminal use the same carrier frequency and are separated in the time domain.

5. The method according to claim 4, wherein at least two different relay base stations use different orthogonal carriers for their transmissions with said at least one super base station, in particular different carrier frequencies, transmission instances, polarizations, or codes.

6. The method according to claim 5, wherein at least two different use different time instances for their transmissions with said at least one super base station, and wherein different transmission time instances are predetermined for different relay base stations.

7. The method according to claim 4, wherein at least two different relay base stations use the same orthogonal carrier for transmissions with said at least one super base station, and wherein said super base station deploys space division multiple access techniques to assure separation of the transmissions of said at least two different relay base stations.

8. The method according to claim 7, wherein a network planning process is used to provide sufficient spatial separation between relay base station-super base station transmissions of said at least two different relay base stations and said at least one super base station.

9. The method according to claim 8, wherein at least two relay base stations are synchronised in a way that said respective uplink and downlink periods in said respective relay base station frame structures are equal and that said respective relay base station frame structures are temporally aligned.

10. The method according to claim 1, wherein in the first case, said uplink portion is at least partially overlaid with said downlink relay base station-super base station transmission period, and wherein in the second case, said downlink portion is at least partially overlaid with said uplink relay base station-super base station period.

11. The method according to claim 4, wherein said frame structure comprises a temporal sequence of super frames, wherein each super frame comprises at least one uplink relay base station-terminal period, at least one downlink relay base station-terminal period, and either at least one relay base station uplink period or at least one relay base station-super base station downlink period.

12. The method according to claim 11, wherein said up- and downlink relay base station-terminal periods take turns from superframe to superframe.

13. The method according to claim 1, wherein said uplink transmissions and said downlink transmissions between said at least one relay base station and said at least one terminal take place at least partially in parallel and are separated in the frequency domain by using at least two carrier frequencies.

14. The method according to claim 13, wherein said uplink transmissions between said at least one relay base station and said at least one terminal and said downlink transmissions between said at least one relay base station and said at least one super base station at least temporarily use the same carrier frequency, and wherein said downlink transmissions between said at least one relay base station and said at least one terminal and said uplink transmissions between said at least one relay base station and said at least one super base station at least temporarily use the same carrier frequency.

15. The method according to claim 13, wherein uplink transmissions and downlink transmissions between said at least one super base station and at least one super base station terminal take place at least partially in parallel and are separated in the frequency domain by using at least two carrier frequencies.

16. The method according to claim 13, wherein on each of said at least two carrier frequencies that are used for the separation of said uplink transmissions and said downlink transmissions between said at least one relay base station and said at least one terminal, said uplink and downlink periods take place in an alternating fashion.

17. The method according to claim 16, wherein at least two relay base stations are synchronized, in a way that said respective uplink and downlink periods in said respective relay base station frame structures are equal and that said respective frame structures are temporally aligned.

18. The method according to claim 17, wherein multiple-input-multiple-output techniques are used for transmissions between said at least one relay base station and said at least one super base station and/or between said at least one super base station and said at least one super base station terminal and/or between said at least one and said at least one terminal.

19. The method according to claim 13, wherein on a first of said at least two carrier frequencies that are used for the separation of said uplink transmissions and said downlink transmissions between said at least one relay base station and said at least one terminal, said uplink transmissions take place, and wherein on a second of said at least two carrier frequencies, said downlink transmissions take place.

20. The method according to claim 13, wherein at least two relay base stations are not synchronized, in a way that said respective uplink and downlink periods in said respective relay base station frame structures are equal but that said respective frame structures are not temporally aligned.

21. The method according to claim 1, wherein a handover of said at least one relay base station from a first super base station to a second super base station is possible, and wherein handover parameters are signalled between said at least one relay base station, said first super base station and said second super base station.

22. The method according to claim 1, wherein said up- and downlink data is relayed between said at least one super base station and said at least one terminal via n relay base stations, where n is an integer number equal to or larger than two.

23. The method according to claim 1, wherein data of one link direction is relayed between said at least one super base station and said at least one terminal via n relay base station, where n is an integer number equal to or larger than 1, and wherein data of the other link direction is transmitted between said at least one super base station and said at least one terminal via m relay base stations, wherein m is an integer number between 0 and n−1.

24. The method according to claim 23, wherein the decision whether a terminal becomes said at least one super base station terminal or not is also based on delay requirements of active applications in said terminal.

25. The method according to claim 1, wherein a first terminal and a second terminal communicate during said uplink and/or downlink inter relay base station-super base station transmission periods.

26. The method according to claim 1, wherein said at least one terminal communicates with its peripherals during said uplink and/or downlink relay base station-super base station transmission periods.

27. The method according to claim 1, wherein for said transmissions between said at least one relay base station and said at least one super base station, different coding schemes and/or modulation schemes and/or packet structures are used as for said transmissions between said at least one relay base station and said at least one terminal or said transmissions between said at least one super base station and said at least one super base station terminal.

28. A computer-readable storage medium comprising a computer program with instructions operable to cause a processor to perform the method of claim 1.

29. An apparatus for allocation of transmission periods in a communication system, which communication system comprises at least one super base station, at least one terminal and at least one relay base station that is useable to relay up- and downlink data between said at least one super base station and said at least one terminal, a start and a duration of up- and downlink relay base station-terminal transmission periods, in which up- and downlink transmissions between said at least one relay base station and said at least one terminal take place, and a start and a duration of up- and downlink relay base station-super base station transmission periods, in which up- and downlink transmissions between said at least one relay base station and said at least one super base station take place, defined by a relay base station frame structure, said apparatus comprising: a processor and computer program code configured to, with the processor, cause the apparatus to perform a dynamic allocation of said up- and downlink relay base station-super base station transmission periods in said relay base station frame structure under consideration of an asymmetry between said up- and downlink data relayed between said at least one super base station and said at least one terminal via said at least one relay base station,
  wherein an uplink period, in which uplink transmissions between said at least one relay base station and said at least one terminal can take place, and a downlink period, in which downlink transmissions between said at least one relay base station and said at least one terminal are allowed to take place, are fixedly defined in said relay base station frame structure,
  wherein said dynamic allocation of said up- and downlink relay base station-super base station transmission periods in said relay base station frame structure comprises an at least partial overlaying of said uplink and/or downlink periods with said up- and/or downlink relay base station-super base station transmission periods, and
  wherein said asymmetry between said up- and downlink data relayed between said at least one super base station and said at least one terminal via said at least one relay base station is considered in said dynamic allocation of said up- and downlink relay base station-super base station transmission periods in said relay base station frame structure by increasing said overlaid uplink portion if there is more data to be transmitted in said downlink transmission between said at least one relay base station and said at least one terminal as compared to said uplink transmission, and increasing said overlaid downlink portion if there is more data to be transmitted in said uplink transmission between said at least one relay base station and said at least one terminal as compared to said downlink transmission.

30. The apparatus according to claim 29, wherein said apparatus is a part of said at least one relay base station, or of said at least one super base station, or of a core network of said communication system.

31. The apparatus according to claim 29, wherein up- and downlink data is also directly transmitted between said at least one super base station and at least one super base station terminal.

32. The apparatus according to claim 29, wherein said uplink transmissions and said downlink transmissions between said at least one relay base station and said at least one terminal use the same carrier frequency and are separated in the time domain.

33. The apparatus according to claim 29, wherein at least two different relay base stations use different orthogonal carriers for their transmissions with said at least one super base station.

34. The apparatus according to claim 29, wherein at least two different relay base stations use different time instances for their transmissions with said at least one super base station, and wherein different transmission time instances are predetermined for different relay base stations.

35. The apparatus according to claim 32, wherein at least two different relay base stations use the same orthogonal carrier for their transmissions with said at least one super base station, and wherein said super base station deploys space division multiple access techniques to assure the separation of the transmissions of said at least two different relay base stations.

36. The apparatus according to claim 35, wherein a network planning process is used to provide spatial separation between relay base station-super base station transmissions of said at least two different relay base stations and said at least one super base station.

37. The apparatus according to claim 36, wherein at least two relay base stations are synchronised in a way that said respective uplink and downlink periods in said respective relay base station frame structures are equal and that said respective relay base station frame structures are temporally aligned.

38. The apparatus according to claim 29, wherein in the first case, said uplink portion is at least partially overlaid with said downlink relay base station-super base station transmission period, and wherein in the second case, said downlink portion is at least partially overlaid with said uplink relay base station-super base station period.

39. The apparatus according to claim 32, wherein said frame structure consists of a temporal sequence of super frames, wherein each super frame comprises at least one uplink relay base station-terminal period, at least one downlink relay base station-terminal period, and either at least one relay base station-super base station uplink period or at least one relay base station-super base station downlink period.

40. The apparatus according to claim 39, wherein said up- and downlink relay base station-terminal periods take turns from superframe to superframe.

41. The apparatus according to claim 29, wherein said uplink transmissions and said downlink transmissions between said at least one relay base station and said at least one terminal take place at least partially in parallel and are separated in the frequency domain by using at least two carrier frequencies.

42. The apparatus according to claim 41, wherein said uplink transmissions between said at least one relay base station and said at least one terminal and said downlink transmissions between said at least one relay base station and said at least one super base station at least temporarily use the same carrier frequency, and wherein said downlink transmissions between said at least one relay base station and said at least one terminal and said uplink transmissions between said at least one relay base station and said at least one super base station at least temporarily use the same carrier frequency.

43. The apparatus according to claim 41, wherein uplink transmissions and downlink transmissions between said at least one super base station and at least one super base station terminal take place at least partially in parallel and are separated in the frequency domain by using at least two carrier frequencies.

44. The apparatus according to claim 41, wherein on each of said at least two carrier frequencies that are used for the separation of said uplink transmissions and said downlink transmissions between said at least one relay base station and said at least one terminal, said uplink and downlink periods take place in an alternating fashion.

45. The apparatus according to claim 44, wherein at least two relay base stations are synchronised in a way that said respective uplink and downlink periods in said respective relay base station frame structures are equal and that said respective relay base station frame structures are temporally aligned.

46. The apparatus according to claim 45, wherein multiple-input-multiple-output techniques are used for the transmissions between said at least one relay base station and said at least one super base station and/or between said at least one super base station and said at least one super base station terminal and/or between said at least one relay base station and said at least one terminal.

47. The apparatus according to claim 41, wherein on a first of said at least two carrier frequencies that are used for the separation of said uplink transmissions and said downlink transmissions between said at least one relay base station and said at least one terminal, said uplink transmissions take place, and wherein on a second of said at least two carrier frequencies, said downlink transmissions take place.

48. The apparatus according to claim 41, wherein at least two relay base stations are not synchronised, in a way that said respective uplink and downlink periods in said respective relay base station frame structures are equal but that said respective relay base station frame structures are not temporally aligned.

49. The apparatus according to claim 29, wherein a handover of said at least one relay base station from a first super base station to a second super base station is possible, and wherein handover parameters are signalled between said at least one relay base station, said first super base station and said second super base station.

50. The apparatus according to claim 29, wherein said up- and downlink data is relayed between said at least one super base station and said at least one terminal via n relay base stations, where n is an integer number equal to or larger than 2.

51. The apparatus according to claim 29, wherein data of one link direction is relayed between said at least one super base station and said at least one terminal via n relay base station, where n is an integer number equal to or larger than 1, and wherein data of the other link direction is transmitted between said at least one super base station and said at least one terminal via m relay base station, wherein m is an integer number between 0 and n−1.

52. The apparatus according to claim 29, wherein for said transmissions between said at least one relay base station and said at least one super base station, different coding schemes and/or modulation schemes and/or packet structures are used as for said transmissions between said at least one relay base station and said at least one terminal or said transmissions between said at least one super base station and said at least one super base station terminal.

53. An apparatus for allocation of transmission periods in a communication system, which communication system comprises at least one super base station, at least one terminal and at least one relay base station that is useable to relay up- and downlink data between said at least one super base station and said at least one terminal, a start and a duration of up- and downlink relay base station-terminal transmission periods, in which up- and downlink transmissions between said at least one relay base station and said at least one terminal take place, and a start and a duration of up- and downlink relay base station-super base station transmission periods, in which up- and downlink transmissions between said at least one relay base station and said at least one super base station take place, defined by a relay base station frame structure, said apparatus comprising: means for dynamically allocating said up- and downlink relay base station-super base station transmission periods in said relay base station frame structure under consideration of an asymmetry between said up- and downlink data relayed between said at least one super base station and said at least one terminal via said at least one relay base station, wherein an uplink period, in which uplink transmissions between said at least one relay base station and said at least one terminal can take place, and a downlink period, in which downlink transmissions between said at least one relay base station and said at least one terminal are allowed to take place, are fixedly defined in said relay base station frame structure, wherein said dynamically allocating said up- and downlink relay base station-super base station transmission periods in said relay base station frame structure comprises at least partially overlaying said uplink and/or downlink periods with said up- and/or downlink relay base station-super base station transmission periods, and wherein said asymmetry between said up- and downlink data relayed between said at least one super base station and said at least one terminal via said at least one relay base station is considered in said dynamically allocating said up- and downlink relay base station-super base station transmission periods in said relay base station frame structure by increasing said overlaid uplink portion if there is more data to be transmitted in said downlink transmission between said at least one relay base station and said at least one terminal as compared to said uplink transmission, and increasing said overlaid downlink portion if there is more data to be transmitted in said uplink transmission between said at least one relay base station and said at least one terminal as compared to said downlink transmission.

\* \* \* \* \*